United States Patent [19]

Queneau et al.

[11] 4,334,919

[45] Jun. 15, 1982

[54] METHOD OF INTRODUCING PARTICULATE MATERIAL AND A GAS INTO A REACTOR

[76] Inventors: Paul E. Queneau, Cornish, N.H. 03746; Horst J. Richter, P.O. Box 59, Norwich, Vt. 05055; Reinhardt Schuhmann, Jr., 1206 Hayes St., West LaFayette, Ind. 47906

[21] Appl. No.: 150,451

[22] Filed: May 16, 1980

Related U.S. Application Data

[62] Division of Ser. No. 86,659, Oct. 22, 1979.

[51] Int. Cl.³ .......................... C22B 1/10; C22B 5/14; C22B 15/00; C21B 11/00
[52] U.S. Cl. ................................ 75/23; 75/9; 75/26; 75/40; 75/67 R; 75/74; 75/77; 75/82; 75/85; 75/87; 75/92; 431/9
[58] Field of Search ................. 75/26, 9, 23, 40, 67 R, 75/74, 77, 82, 85, 87, 92; 431/9

[56] References Cited

U.S. PATENT DOCUMENTS 4,217,132 8/1980 Burge et al. .......................... 75/26

Primary Examiner—M. J. Andrews
Attorney, Agent, or Firm—Parmelee, Miller, Welsh & Kratz

[57] ABSTRACT

A sprinkler burner and method for injecting solid particulate material and a gas into a reactor as a paraboloidal suspension. Means are provided to introduce the gas tangentially into an outer cylindroidal member, comprising a slot-like gas inlet in the cylindroidal member and a spiral shaped conduit communicating with the slot, such that the gas is directed around the periphery and downward between the outer cylindroidal member and an inner tubular member through which the solids are fed. The gas entrains the solids emitting from the inner tubular member and spreads the solids tangentially from the exhaust end of the outer cylindroidal member such that a paraboloidal suspension is formed within a reactor.

7 Claims, 5 Drawing Figures

EQUIVALENT MASS ACCUMULATION ON SLAG SURFACE BELOW PRIOR ART BURNER AND BELOW SPRINKLER BURNER

METHOD OF INTRODUCING PARTICULATE MATERIAL AND A GAS INTO A REACTOR

This is a division, of application Ser. No. 86,659 filed Oct. 22, 1979.

BACKGROUND OF THE INVENTION

Numerous processes, especially in the field of pyrometallurgy, require the reaction of solid particulate material and a gas within an enclosure at elevated temperatures. Means for introducing suspensions of such particulate matter and gas have been previously proposed, but problems remain as to the means for such introduction into a highly heated atmosphere such that maximum gas-solid contact can be effected. In such processes, satisfactory contact of the particulate material and the gas is required during the brief exposure to the hot atmosphere, so as to provide adequate reaction rates.

An example of the type of processes to which the present means for introducing a particulate material and gas and the present method are directed is in the flash smelting of sulfide ores. Such a process requires that the solid sulfide ore particles and oxygen-containing gas be intimately mixed and that reaction of the two additives be effected rapidly. If such sulfides are flash smelted in a reverberatory furnace, for example, the distance between the roof of the furnace and the molten material in the furnace is usually less than 3 meters. Thus, the solid sulfide and oxygen-containing gas must be charged through the roof of the furnace by burners that will spread the material and form well dispersed suspensions that give intimate gas-solid-liquid contact and optimize interphase heat and mass transfer prior to the material reaching the molten bath.

A means for forming a paraboloidal suspension of a powdery substance and a reaction gas in a reaction space is disclosed in U.S. Pat. No. 4,147,535, utilizing the falling motion energy of solid matter and a specifically designed deflecting surface, optionally with horizontal jets of supplemental gas assisting in the spreading of the solid matter. The process and apparatus therein disclosed utilize the kinetic energy of the solids, and by use of the specified sliding surface, the powdery substance spreads laterally and meets the reaction gas flow substantially at right angles thereto in the reaction space.

In the present apparatus and process, a tangential introduction of a gas is effected, such that solids emitting from an inner tubular member are entrained by the circulating flow of gases and discharged from an outer cylindroidal member at a tangential spreading velocity greater than one-half the vertical downward velocity thereof, with a paraboloidal suspension formed in the reactor.

SUMMARY OF THE INVENTION

A burner construction and method for introducing a suspension of solid particulate material and a gas into a reaction vessel are described which use introduction of a tangential stream of gas into a cylindroidal member, the tangential stream entraining solid particulate material emitted from a tubular member situated within the cylindrical member such that the gas carrying the material exits from the cylindroidal member at a tangential spreading velocity greater than one-half, and preferably greater than, the vertical downward velocity thereof, such that a paraboloidal suspension is formed within the reaction vessel. The burner construction comprises an inner tubular member and a coaxial surrounding cylindroidal member, with means to feed solid particulate matter through the inner tubular member and over a conical member adjacent the end of the inner tubular member, and means to introduce the gas tangentially through the wall of the outer cylindroidal member such that solid particulate material exiting the inner tubular member is picked up by the circulating stream of gas between the inner tubular member and outer cylindroidal member and discharged from the exhaust end of the outer cylindroidal member as a paraboloidal suspension. The gas discharged from the exhaust end of the cylindroidal member has a tangential spreading velocity greater than one-half the vertical downward velocity thereof. A further embodiment uses a rotating inner tubular member with an angularly offset lower section in conjunction with the tangential introduction of the gas.

The preferred means for introducing the gas tangentially into the chamber between the inner tubular member and the outer cylindroidal member comprises a slot through and substantially about the circular wall of the cylindroidal member and a spiral shaped conduit arranged about the cylindrical member and communicating with the slot, the conduit forming a passage of continuously diminishing cross-sectional area.

DETAILED DESCRIPTION

The present burner and method are usable with various processes where a paraboloidal suspension of a solid particulate material in a gas is to be used.

Figure 1:
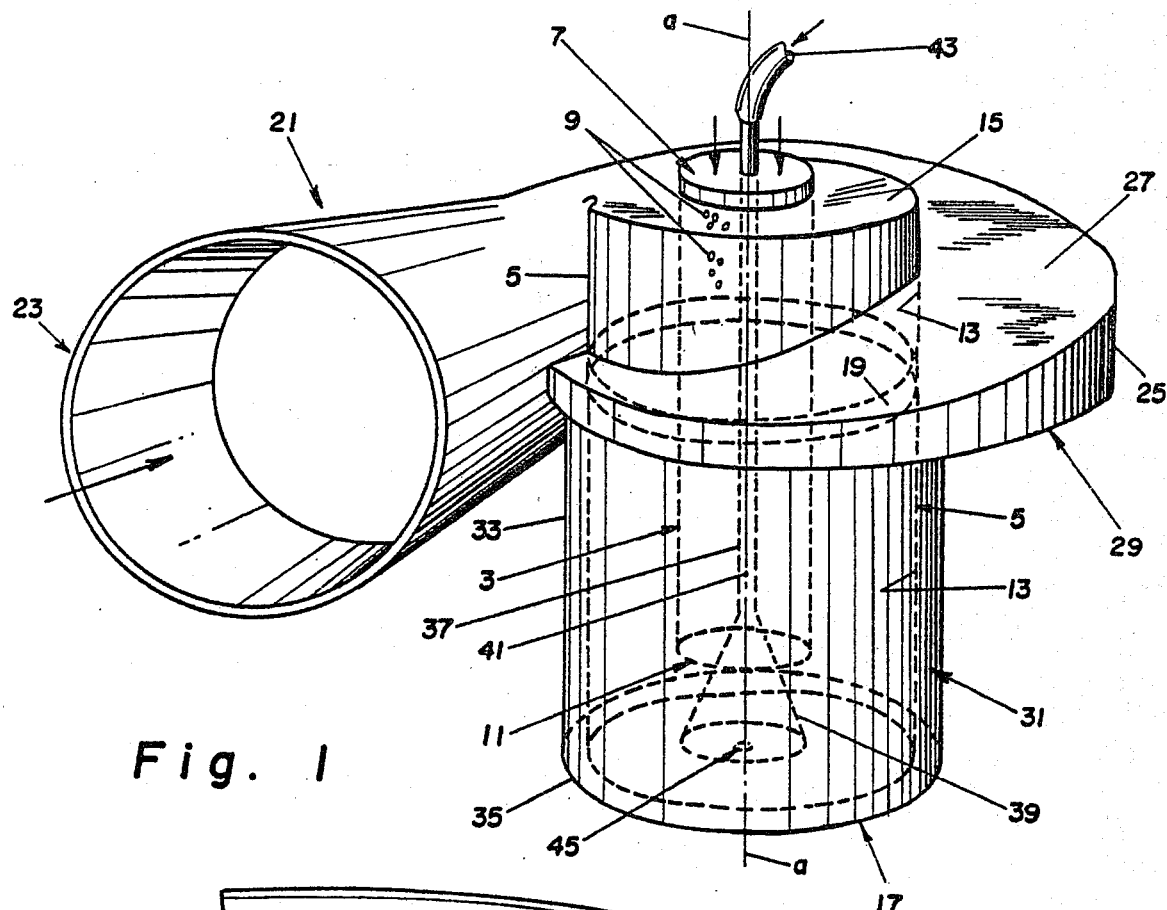
FIG. 1 is a schematic illustration of the burner of the present invention, usable in carrying out the process of the present invention.
Figure 2:
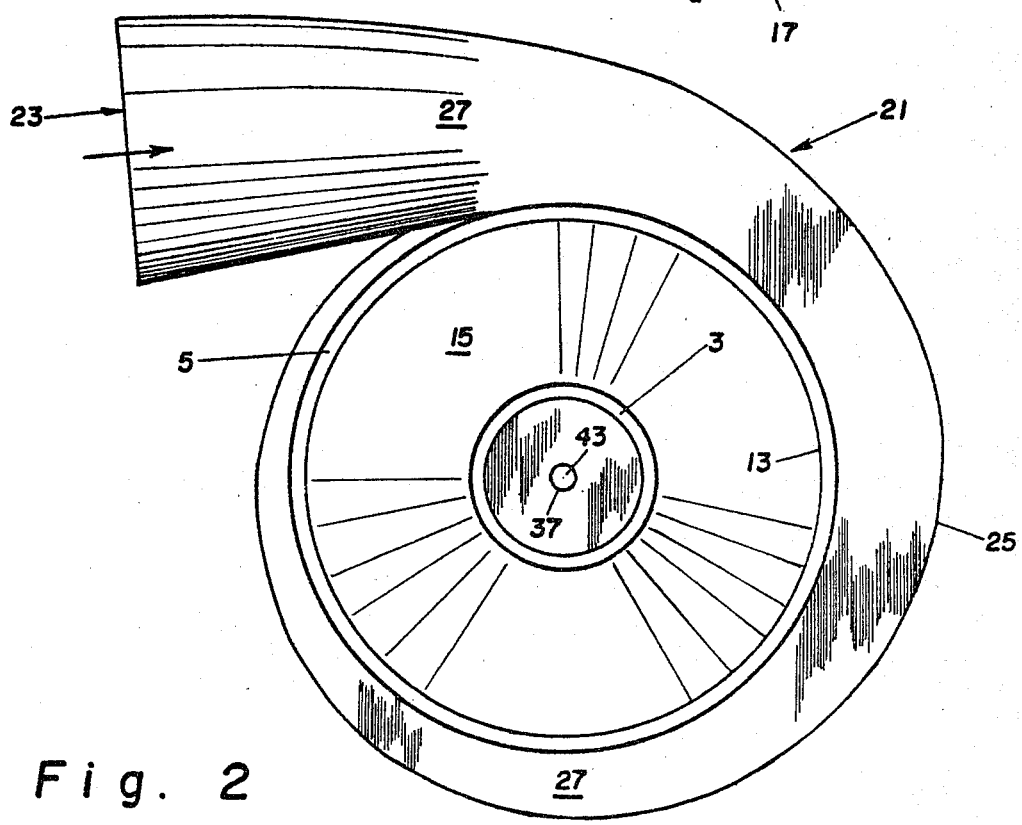
FIG. 2 is a top plan view of the burner illustrated in FIG. 1, better showing the conduit for introduction of the gas through the wall of the outer cylindroidal member of the burner.

As illustrated in FIGS. 1 and 2, the present preferred apparatus 1 comprises concentric members 3 and 5 and means for charging a gas and a solid particulate material thereto. Inner tubular member 3 has an inlet end 7 through which solid particulate material 9 is charged with a feeder (not shown) such as a conventional solids feeder or metering system, with the solid particulate material passing axially downward through the tubular member 3 and exiting from outlet 11.

The outer cylindroidal member 5, concentric with the inner tubular member 3, has a circular wall 13 having a closed upper end such as by flange 15, which flange 15 may support the inner tubular member. The inner tubular member 3 and cylindroidal member 5 have a common axis a, and the outer cylindroidal member 5 has an exhaust end 17 that is spaced, in the axial direction, from the open end 11 of the inner tubular member 3. The wall of the outer cylindroidal member, if desired, may be sloped at an angle of less than 20° to the vertical, from the gas inlet to the exhaust end.

A gas feeding means to tangentially introduce a gas into the outer cylindroidal member 5, through circular wall 13, by means of an inlet 19 in the circular wall 13, comprises a conduit 21 which has an inlet 23 for introduction of the gas from a source, not shown, and which is fabricated in a spiral shape and formed about the outer cylindroidal member 5. This spiral shaped conduit 21 is formed of an outer wall 25, and upper and lower walls 27 and 29 respectively, with the walls diminishing in size from initial contact of the conduit with the outer tubular member 5, until said walls encircle said tubular member.

The conduit thus forms a closed passage, except for inlet 19, for the gas, of a continuously diminishing cross-sectional area. The gas inlet 19 is preferably in the form of slot, as illustrated, in the circular wall 13 of the outer cylindroidal member 5 such that a gas introduced into the conduit 21 through inlet 23 will be tangentially introduced through the slot into the outer cylindroidal member 5. The outer cylindroidal member 5 is preferably surrounded by a chamber 31 to provide a cooling jacket for the outer cylindroidal member 5, the water chamber formed by spacing a cooling chamber wall 33 from the outer tubular member, the cooling chamber wall having a closed lower end 35 and inlets and outlets (not shown) for cooling media to pass therethrough.

Situated within the inner tubular member 3, and coaxial therewith, is a support rod 37, the support rod having at its end proximate the outlet 11 of the inner tubular member 3 a conical shaped diverter member 39. Preferably, the supporting rod and diverter member 39 have bores or hollows 41 therethrough, which communicate with each other, and water or other coolant is supplied, from a source not shown, through an inlet 43 to the hollows 41, which coolant passes through the rod and diverted member to cool the same. The slope of the conical member from apex to base should be less than 45° to the axis of the inner tubular member.

The apparatus of the present invention is especially suited to the charging, for example, of a nonferrous solid sulfide flotation concentrate and oxygen-rich gas into the hot atmosphere of a furnace, as a paraboloidal suspension, to produce a metal matte therefrom. Such a process is described in application Ser. No. 971,995 filed Dec. 21, 1978, now U.S. Pat. No. 4,236,915 of two of the present inventors, entitled "Process for Oxygen Sprinkle Smelting of Sulfide Concentrates," the contents of said application incorporated by reference herein.

A solid particulate material 9, such as a sulfide concentrate, preferably of a particle size of less than about 48 mesh, is fed through inlet 7 and passed axially through the inner tubular member 3. As the solid material exits the inner tubular member 3 through outlet 11, the solid particulate material contacts diverter member or cone 39 and is radially disposed. An oxygen-rich gas, at the same time, is charged through inlet 23 to the conduit 21, the gas passing around the spiral formed by walls 25, 27 and 29 of the conduit and is injected through slot 19 in the circular wall 13 tangentially into the outer cylindroidal member 5 and vertically downwardly therethrough. As the spiraling gas passes the outlet 11 and diverter member 39, the gas entrains the solid particulate material 9 as a suspension having a tangential spreading velocity greater than one-half the vertical downward velocity thereof, such that the solid particulate material, in suspension in the oxygen-rich gas, is discharged tangentially from the exhaust end 17 of outer cylindroidal member 5. The suspension discharged from the exhaust end 17 of the outer cylindroidal member 5 has a tangential spreading velocity preferably in excess of the vertical downward velocity thereof, such that the suspension is discharged as a suspension in paraboloidal shape.

Figure 3:
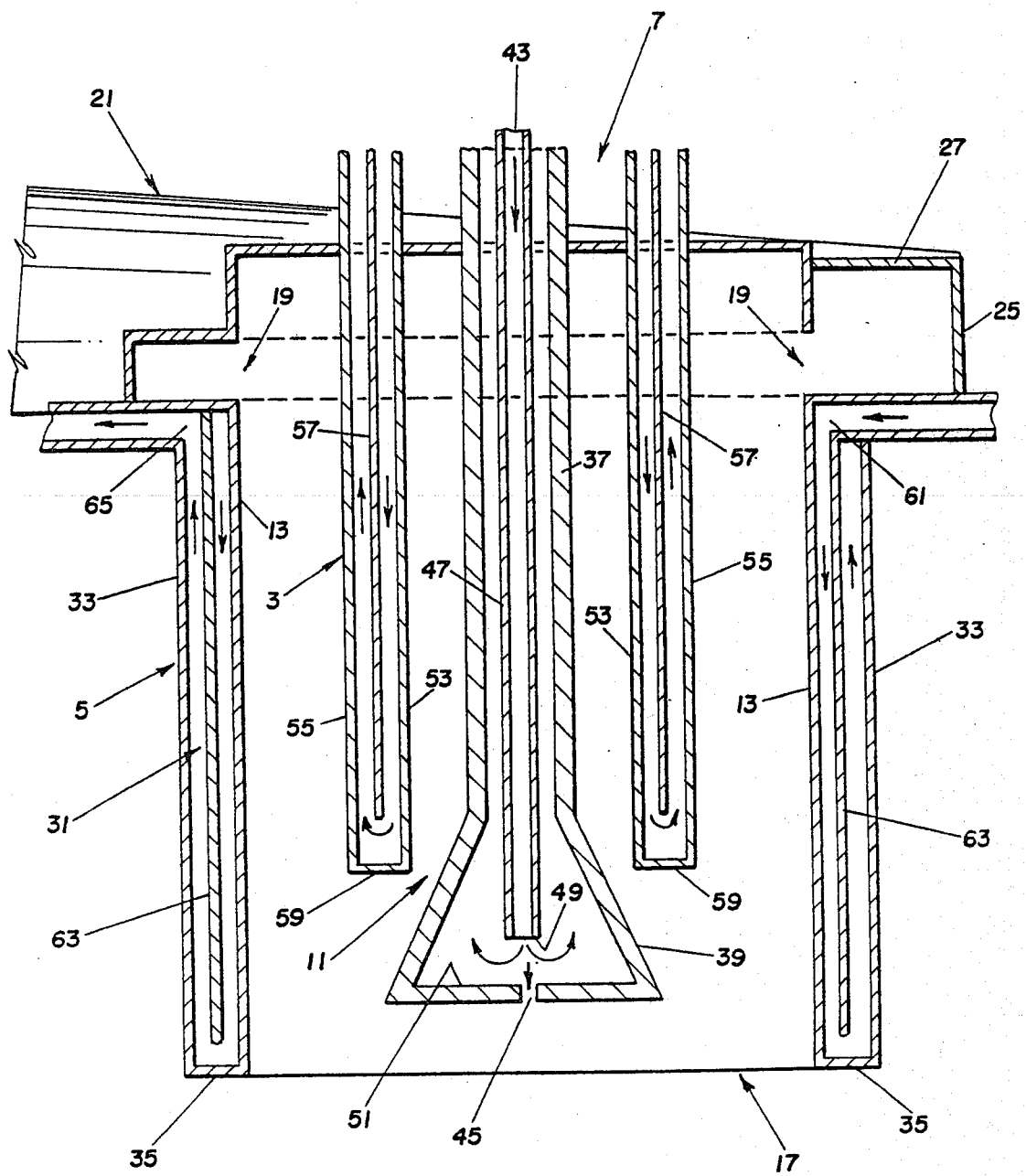
FIG. 3 is a cross-sectional view of a burner similar to that illustrated in FIG. 1, illustrating means for cooling the cone member, the inner tubular member and the outer cylindroidal member.

A cooling fluid, such as water, may be injected through the cooperating bores 41 in the supporting rod 37 and diverter member 39, which cools the area of the inner tubular member 3 and, with at least a portion discharged through opening 45, so as to cool the diverter member and its surroundings. Another embodiment of means for cooling the supporting rod 37 and diverter member 39 is illustrated in FIG. 3, wherein the supporting rod and diverter member are an integral unit with a cooling fluid tube 47 situated therein, the open end 49 of the cooling fluid tube being spaced from the bottom 51 of the diverter member 39. As illustrated, cooling fluid, such as water, is fed downwardly through the cooling fluid tube 47, out of the end 49 thereof, with a portion of the cooling fluid passing through the opening 45, while the remainder is passed upwardly and out of the channel between cooling fluid tube 47 and the inner wall of supporting rod 37 to be exhausted therefrom. Means are also provided to cool the inner tubular member 3, comprising spaced walls 53 and 55 and a divider plate 57 therebetween, the divider plate terminating short of the end wall 59 connecting walls 53 and 55. Cooling fluid is injected between wall 53 and dividing plate 57 and is exhausted between dividing plate 57 and outer wall 55. In addition, coolant for the outer cylindroidal member 5 may be injected through openings such as 61 downwardly and around divider plate 63, and discharged from spaced openings 65 to cool the same.

In some instances, it may be desirable to vibrate the inner tubular member 5 or the support rod 37, with its diverter member 39, or both, in order to assist the flow of the solid particulate material through the inner tubular member, which vibrations may be effected by known vibrational means.

Figure 4:
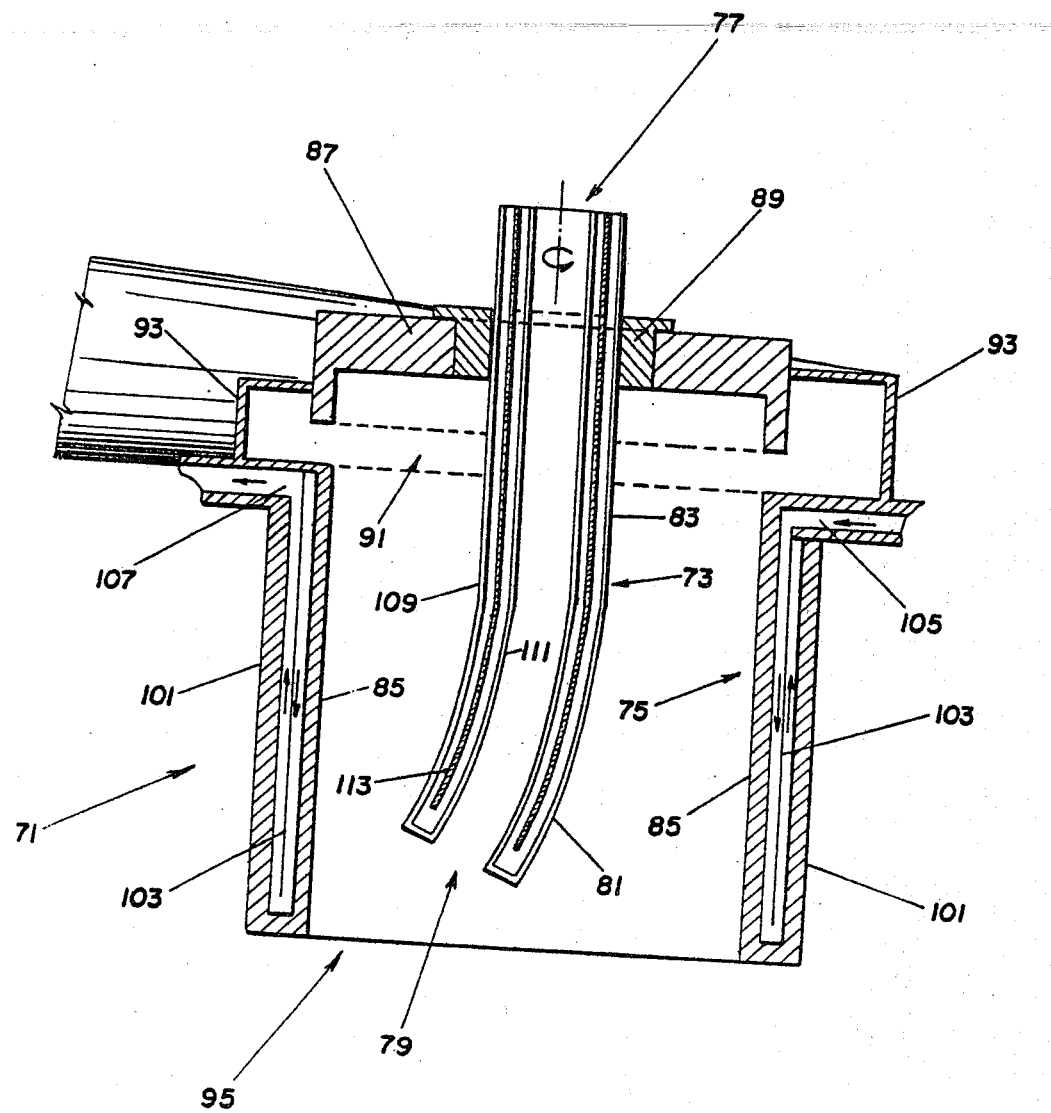
FIG. 4 is a cross-sectional view of a burner of the present invention illustrating the use of a rotatable inner tubular member for feeding of solid particulate material.

In the embodiment illustrated in FIG. 4, the support rod and diverter member are deleted and the inner tubular member is arranged to rotate for charging of the solid particulate material. As shown, the apparatus 71 comprises an inner tubular member 73 and outer cylindroidal member 75. The inner tubular member 73 has an inlet 77 through which solid particulate material is fed from a feeder (not shown) and an outlet 79. In this embodiment, the outlet end section 81 of the inner tubular member is displaced from the axis of the remainder of the inner tubular member 83 such that the outlet end section extends toward the circular inner wall 85 of the outer cylindroidal member 75. Such displacement should be to the extent that an acute angle is formed to the vertical axis of less than about 20°, with an angular displacement of less than about 15° being preferred. The tubular member 73 is rotatably secured within the closed end 87 of the outer cylindroidal member by a bearing 89 which enables rotation of the inner tubular member 73 by any suitable means for effecting rotation (not shown). Gas is introduced through the circular wall 85 through the slot 91, by use of the spiral shaped diminishing cross-section conduit 93 communicating therewith, as in the previously described embodiments, and the outer cylindroidal member has an exhaust end 95 spaced axially from the outlet end 79 of the inner tubular member 73. For cooling purposes, the outer cylindroidal member 75 has a spaced outer wall 101, and a divider plate 103 situated in the chamber formed by outer wall 101 and inner wall 85. Inlets such as inlet 105 and outlets such as outlet 107 are provided for passage of coolant therethrough. The inner tubular member 73, for purposes of cooling thereof, may have spaced walls 109 and 111 and a divider wall 113 therebetween, so that coolant may be passed between the spaced walls, as described relative to the inner tubular member of FIG. 3.

The cooling fluid for use in cooling of the walls of the inner tubular member and the outer cylindroidal member of the present burner is preferably water. The cooling fluid that is passed through the diverter member 39, for injection into the reactor, may comprise water, air, nitrogen or, where a sulfur dioxide atmosphere is present in the reactor, sulfur dioxide. Injection of cooling fluid through the conical member and into the region of the burner exhaust and below provides effective cooling of that region.

Figure 5:
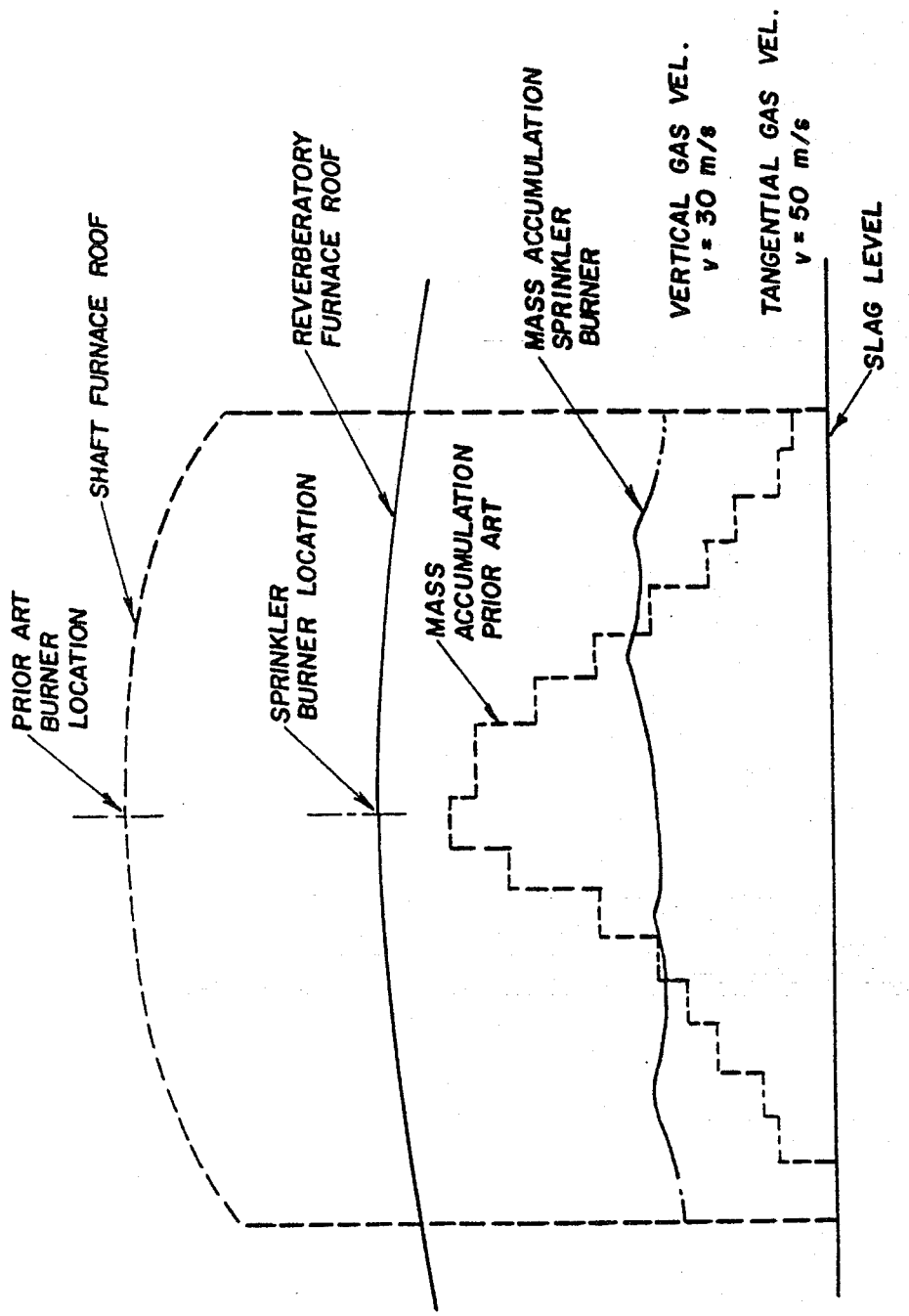
FIG. 5 is a mass distribution measurement, showing the present excellent and uniform distribution of material over a surface as compared with the prior art.

As illustrated quantitatively in FIG. 5, the sprinkler burner of the present invention produces a much more uniform and wider mass distribution of 200 mesh metalliferous sulfide particles over the slag surface in a reactor, and from a lower discharge level above it, than the burner of U.S. Pat. No. 4,147,535. This major improvement is obtained by using the high tangential velocity of the combustion gas for particle spreading purposes instead of a specially curved horn.

The present method for introducing a suspension of solid particulate material in a gas into a reaction space as a paraboloidal suspension is suitable for numerous processes benefiting from efficient gas-solid-liquid heat and mass transfer. As previously described, the method is especially suited for use in smelting of metalliferrous sulfide ores, such as smelting of copper, nickel, cobalt and lead, or mixtures of such sulfides. The process is also useful in the flash melting of particulates such as sulfides; in slag treatment, for example for melting and reduction of nickel-cobalt containing slags; for the flash reduction of oxidic materials, such as oxides of cobalt, copper, iron, lead, magnesium, tin and zinc; and also for the flash roasting of sulfides such as molybdenite.

The method enables the introduction of solid particulate material in a gas into a reactor such that the solids are tangentially dispersed over a wide area and gravity effects cause a paraboloidal suspension of the solid particulate material. In the method, a supply of solid particulate material is introduced through a vertically disposed tubular member and spread tangentially therefrom by directing the gas tangentially into the space between the tubular member and a surrounding coaxial outer cylindroidal member. As the gas passes circularly downwardly through that space, solids emitted from the inner tubular member are entrained to form a suspension of the solid particulate matter in the gas, and the suspension is discharged from the outer cylindroidal member at a tangential spreading velocity greater than one-half of the vertical downward velocity thereof. Preferably, the suspension containing gas is discharged from the outer cylindroidal member at a tangential spreading velocity greater than the vertical downwardly velocity thereof. A significant effect of the tangential gas velocity is to create a negative pressure adjacent the inner tubular member outlet thus assisting in the flow of solids therefrom.

The tangential and vertical downward velocity of the gas at the exhaust end of the burner should be sufficient to prevent ignition of combustibles within the cylindroidal member.

As exemplified in FIG. 5, the use of the present apparatus and method provides exceptional uniformity in the mass distribution of particles per unit area of surface, such as slag, upon which the particles are disposed. For example, in a reverberatory furnace, wherein the slag layer is less than three meters below the exhaust end of the cylindroidal member, the tangential spreading velocity and vertical downward velocities may be produced such that the deviation in mass distribution on the slag layer is less than two to one within a circle more than four meters in diameter on the surface of the slag. Under conditions of limited head room, therefore, excellence in gas-liquid-solid contact of reactants and in particulate dispersion and in mixing over a wide area are achieved.

Examples of the versatility of the present apparatus and method follows.

EXAMPLE I

As an example of the use of the present method in the flash smelting of copper concentrate, the following constants are used:

Concentrate analysis (dried)=29.5% Cu; 26.0% Fe; 31.0% S; 8% $SiO_2$; 5.4% oxides; and 0.1% $H_2O$
Slag Composition: 38.3% $SiO_2$
Temperatures: Slag and matte=2200° F.; Flue Gas=2300° F.
Flux analysis (dried)=81.5% $SiO_2$
Temperature of all materials charged: 77° F.
Commercial Oxygen=98% $O_2$, 2% $N_2$ (100% reacts)
Charge Rate=1350 ton/day of concentrate
Heat Loss Rate=518,000 Btu/minute
Air infiltration Rate=2500 SCFM (75% of oxygen in infiltrated air reacts)
Coal Analysis (as received)=61.0% C; 4.5% $H_2$; 5.0% S; 19.5% ash; and 10.0% $H_2O$: heating value of 11300 Btu/lb.
Coal dried to 0.10% $H_2O$
Heat losses and infiltrated air divided evenly among three burners.

Using the burner illustrated in FIG. 1, and the method of the present invention, where three such burners are situated within the roof of a reverberatory furnace, as described in heretofore mentioned copending application Ser. No. 971,995, the copper concentrate identified above is smelted at a rate of 1350 tons per day, with 450 tons per day of concentrate introduced through each of the three burners. Two burners (#1 and #2) operate in an autogenous mode for smelting, while the burner closest to the gas discharge end of the furnace (#3) operates in a melting condition with coal added. The material balance of the operation, based upon 100 pounds of concentrate, is:

| | POUNDS | | | |
|---|---|---|---|---|
| MATERIAL | BURNER #1 | BURNER #2 | BURNER #3 | TOTAL |
| IN | | | | |
| Concen. | 33.3 | 33.3 | 33.4 | 100.0 |
| Infil. Air. | 3.6 | 3.6 | 3.6 | 10.8 |
| Coal | 0 | 0 | 1.6 | 1.6 |
| Comm. $O_2$ | 7.8 | 7.8 | 6.2 | 21.8 |
| Flux | 5.0 | 5.0 | 0 | 10.0 |
| Totals | 49.7 | 49.7 | 44.8 | 144.2 |
| OUT | | | | |
| Matte | 16.1 (61% Cu) | 16.1 (61% Cu) | 26.0 (38% Cu) | 58.2 (50% Cu) |
| Gas | 16.1 | 16.1 | 14.0 | 46.2 |
| Slag | 17.5 | 17.5 | 4.8 | 39.8 |
| Totals | 49.7 | 49.7 | 44.8 | 144.2 |

The overall matte composition produced is 50.8% Cu. The overall gas composition resulting from the operation is (weight percent): 70.1% $SO_2$; 1.3% $O_2$; 17.6% $N_2$; 1.9% $H_2O$ and 9.1% $CO_2$.

The energy balance (Btu's) of the above method, based upon 100 pounds of concentrate, with 450 tons per day at each of the three burners is:

| | Btu's | | | |
|---|---|---|---|---|
| IN SOURCE | BURNER #1 | BURNER #2 | BURNER #3 | TOTAL |
| S Removal | 32310 | 32310 | 11410 | 76030 |
| Coal Comb. | 0 | 0 | 19400 | 19400 |
| Totals | 32310 | 32310 | 30810 | 95430 |
| OUT | | | | |
| Matte | 5780 | 5780 | 10900 | 22460 |
| Gas | 7320 | 7320 | 8000 | 22640 |
| Slag | 10010 | 10010 | 2710 | 22730 |
| Heat Loss | 9200 | 9200 | 9200 | 27600 |
| Totals | 32310 | 32310 | 30810 | 95430 |

The Process Fuel Equivalent (PFE)[1] for this operation is calculated in accordance with the following Table I:

[1] H. H. Kellogg and J. M. Henderson: "Energy Use in Sulfide Smelting of Copper." Extractive Metallurgy of Copper, J. C. Yannapoulos and J. C. Agarwal, Eds. TMS-AIME, Port City Press, Baltimore, 1976. Vol. I, pp. 376-415.

EXAMPLE II

As an example of use of the burner and method of the present invention, using the Constants listed in Example I, where a sprinkler burner is used in smelting of the copper concentrate described, the following material balance results with flash smelting of 450 ton/day of concentrate, to autogenously produce a matte of 61% Cu:

| Basis: 100 Pounds of Concentrate | | |
|---|---|---|
| IN | | |
| Concentrate | 100 | Pounds |
| Infiltrated Air | 10.8 | Pounds |
| Coal | 0 | Pounds |
| Commercial Oxygen | 23.4 | Pounds |
| Flux | 15.0 | Pounds |
| Total | 149.2 | Pounds |
| OUT | | |
| Matte (61% Cu) | 48.4 | Pounds |
| Gas | 48.3 | Pounds |
| Slag | 52.5 | Pounds |
| Total | 149.2 | Pounds |

The gas resulting would have the following analysis (weight %): 81.8% $SO_2$; 1.2% $O_2$; 16.8% $N_2$; and 0.2% $H_2O$.

TABLE I

Oxygen Sprinkle Smelting in Converted Sprung Roof Reverberatory Furnace

| | |
|---|---|
| Smelting Rate: 1350 tons conc./day | 98% Oxygen Used: (100% reacts) = 4900 SCF/ton conc. |
| Fuel Rate: 0.36 × $10^6$ Btu/ton conc. | Infiltration Air: (75% reacts) = 2670 SCF/ton conc. |
| Matte Grade: 50% Cu | Tons Acid Rec./ton anode: = 3.2 |
| OUE: 97.6% | Tons conc./ton anode: = 3.44 |

| | Per Ton Anode Copper | | | |
|---|---|---|---|---|
| Item | Amount | | Unit Energy | $10^6$ Btu |
| 1. Smelting | | | | |
| (a) Drying of charge | 4.2 | ton | 411700 Btu/ton | 1.73 |
| (b) Coal | 110 | lb/ton | 11300 Btu/lb | 1.24 |
| (c) Production of oxygen | 17000 | SCF | 168.9 Btu/SCF | 2.87 |
| (d) Flux for smelting | 0.34 | ton | 100000 Btu/ton | 0.03 |
| (e) Gas handling & dust collection | 24000 | SCF | 2.52 Btu/SCF | 0.06 |
| (f) Steam credit, power generated | 75 | KWH | 10500 Btu/KWH | −0.79 |
| 2. Converting | | | | |
| (a) Total energy input | 1.04 | ton blister | 1.95 × $10^6$ Btu/ton | 2.03 |
| (b) Steam credit, power generated | 92 | KWH | 10500 Btu/KWH | −0.97 |
| 3. Anode Production | 1.0 | ton | 1.35 × $10^6$ Btu/ton | 1.35 |
| 4. Miscellaneous | 48.0 | KWH | 10500 Btu/KWH | 0.50 |
| 5. Acid Mfg. | | | | |
| (a) Furnace gas (53% $SO_2$) | 100 | KWH | 10500 Btu/KWH | 1.05 |
| (b) Converter gas (8.2% $SO_2$) | 130 | KWH | 10500 Btu/KWH | 1.37 |
| PFE = 10.5 × $10^6$ Btu/ton Anode Copper | | | Total | 10.47 |
| = 2.9 × $10^6$ Kcal/tonne Anode Copper | | | | |

EXAMPLE III

As an example of use of the burner and method of the present invention, using the Constants listed in Example I, where a sprinkler burner is used in melting of the copper concentrate described, the following material balance results with flash melting of 450 ton/day of concentrate, to produce a matte of 38% Cu:

| Basis: 100 Pounds of Concentrate | | |
|---|---|---|
| IN | | |
| Concentrate | 100 | Pounds |
| Infiltrated Air | 10.8 | Pounds |
| Coal | 4.8 | Pounds |
| Commercial Oxygen | 18.6 | Pounds |
| Flux | 0 | Pounds |
| Total | 134.2 | Pounds |
| OUT | | |
| Matte (38% Cu) | 77.9 | Pounds |
| Gas | 42.0 | Pounds |
| Slag | 14.3 | Pounds |
| Total | 134.2 | Pounds |

The gas resulting would have the following analysis (weight %): 43.4% $SO_2$; 1.4% $O_2$; 19.2% $N_2$; 5.8% $H_2O$; and 30.2% $CO_2$.

EXAMPLE IV

Molybdenite ($MoS_2$) concentrate is flash oxidized in a water cooled reactor by air sprinkle roasting at 675° C. for production of molybdic oxide ($MoO_3$) calcine and gas containing more than 5% $SO_2$).

EXAMPLE V

Low sulfur zinc oxide calcine is mixed with low sulfur char and flux and reduced to zinc vapor by oxygen sprinkle smelting at 1350° C. for production of zinc vapor, slag and carbon monoxide rich gas ($CO/CO_2=$- greater than 3).

EXAMPLE VI

Magnetite concentrate (68% Fe) is heated to 925° C. in a first stage rotary kiln, burning recycled gas ($CO_2/CO=2.4$) from the second stage operation. The preheated $Fe_3O_4$ is reduced to FeO in a fluid bed reactor at 825° C. employing recycled gas ($CO_2/CO=1$) from the third stage operation. The FeO is mixed with fine coal and flux and reduced to pig iron (4.5% C) by oxygen sprinkle smelting at 1600° C.

As shown by these examples, the sprinkler burner and method of the present invention are useful for numerous reactions between solids and gases. This burner provides the basis for a new unit operation, which offers superior heat and mass transfer by virtue of intimate mixing and scrubbing action due to high relative velocities between particulates and gases. In a reactor having a limited reaction space between the point of introduction of the mixture and a surface, such as slag, present in the reactor, the sprinkler burner provides a paraboloid suspension of much greater volume than the prior art. Particular incentives for its application exist where a wide distribution of a mixture of such solids and gases, and extended reaction time, are desired.

What is claimed is:

1. In a method for introducing a suspension of solid particulate material in a gas as a paraboloidal suspension into a reactor, wherein a supply of solid particulate material is introduced by gravity through a vertical tubular member and spread therefrom, the improvement comprising: directing said gas tangentially between said tubular member and a coaxial outer cylindroidal member so as to form a suspension of solid particulate material, emitted from the central tubular member, in said gas, while preventing contact of said particulate material with said coaxial outer cylindroidal member, and discharging said gas from said outer cylindroidal member at a tangential spreading velocity greater than one-half of the vertical downward velocity thereof.

2. In a method for introducing a suspension of solid particulate material in a gas as a paraboloidal suspension into a reactor as defined in claim 1, the improvement wherein said gas is discharged from said outer cylindroidal member at a tangential spreading velocity greater than the vertical downward velocity thereof.

3. In a method for introducing a suspension of solid particulate material in a gas as a paraboloidal suspension into a reactor as defined in claim 2, the improvement wherein said gas is directed tangentially between said tubular member and said coaxial outer cylindroidal member through a slot formed through and substantially about said outer cylindroidal member.

4. In a method for introducing a suspension of solid particulate material in a gas as a paraboloidal suspension into a reactor as defined in claim 3, the improvement wherein said gas is directed through said slot through a conduit communicating with the slot and in contact with said outer cylindroidal member, the conduit having outer, upper and lower walls, said walls diminishing in width from a point of first contact with the outer cylindroidal member to a point adjacent said point of first contact to form a closed passage, except for said slot, of continuously diminishing cross-sectional area.

5. In a method for introducing a suspension of solid particulate material in a gas as a paraboloidal suspension into a reactor as defined in claim 1, the improvement wherein a diverter member is positioned adjacent the point of emission of the solid particulate material and injecting a coolant through said diverter member to cool the region thereabout.

6. In a method for introducing a suspension of solid particulate material in a gas as a paraboloidal suspension into a reactor as defined in claim 1, the improvement wherein said solid particulate material comprises a nonferrous metal sulfide, and said gas comprises an oxygen-rich gas.

7. In a method for introducing a suspension of solid particulate material in an oxygen-rich gas as a paraboloidal suspension into a reactor as defined in claim 1, the improvement wherein said solid particulate material is coal and a metal oxide selected from the group comprising oxides of cobalt, copper, iron, lead, magnesium, tin and zinc.

* * * * *